United States Patent [19]
Kang et al.

[11] Patent Number: 5,934,586
[45] Date of Patent: Aug. 10, 1999

[54] OSCILLATION MECHANISM FOR SPINNING REEL

[75] Inventors: Young Jue Kang, Tulsa; Thomas D. Clay, Edmond, both of Okla.

[73] Assignee: Zebco Corporation, Tulsa, Okla.

[21] Appl. No.: 08/870,610

[22] Filed: Jun. 6, 1997

[51] Int. Cl.$^6$ .................................................. A01K 89/01
[52] U.S. Cl. ........................................ 242/241; 242/311
[58] Field of Search ................................... 242/241, 242, 242/311

[56] References Cited

U.S. PATENT DOCUMENTS

| | | |
|---|---|---|
| 4,191,343 | 3/1980 | Morishita . |
| 4,865,262 | 9/1989 | Tsunoda ................................... 242/241 |
| 5,143,318 | 9/1992 | Tipton et al. . |
| 5,232,181 | 8/1993 | Fujine ...................................... 242/241 |
| 5,273,234 | 12/1993 | Hitomit .................................... 242/241 |
| 5,316,239 | 5/1994 | Sugawara . |
| 5,350,130 | 9/1994 | Hitomi et al. ........................... 242/241 |
| 5,350,131 | 9/1994 | Baumgartner et al. . |
| 5,427,324 | 6/1995 | Kawashiro .............................. 242/242 |
| 5,775,612 | 7/1998 | Hashimoto .............................. 242/241 |

*Primary Examiner*—Katherine Matecki
*Attorney, Agent, or Firm*—Fellers, Snider, Blankenship, Bailey & Tippens

[57] ABSTRACT

An oscillation assembly for a fishing reel comprising: an elongate member; a transmission body having a side face; and a reciprocating assembly for imparting reciprocating movement to the transmission body. The transmission body includes a groove formed in the side face for receiving the elongate member. The elongate member can be placed in the groove by delivering the elongate member laterally into the side of the fishing reel.

12 Claims, 8 Drawing Sheets

OSCILLATION MECHANISM FOR SPINNING REEL

FIELD OF THE INVENTION

The present invention relates to oscillation assemblies for spinning-type fishing reels.

BACKGROUND OF THE INVENTION

Spinning-type fishing reels are well known in the art. A typical spinning reel comprises: a body structure; a mounting structure, extending from the top of the body structure, for mounting the reel beneath a fishing rod; a pinion sleeve rotatably mounted through the front end of the body structure; a rotor assembly secured to the forward end of the pinion sleeve; a main shaft slidably extending through the pinion sleeve and through the rotor assembly; a line spool secured on the forward end of the main shaft; a bail wire assembly attached to the rotor assembly for grasping a fishing line in order to wind the line around the line spool; a drive shaft extending laterally into the side of the body structure; a crank handle secured on the exterior end of the drive shaft; a drive gear (e.g., a face gear) mounted on the interior portion of the drive shaft; and an oscillation mechanism for imparting reciprocating movement to the main shaft and the line spool.

Typically, the drive gear meshes with a pinion gear (typically a helical gear) formed on the pinion sleeve such that, when the user turns the crank handle, rotational movement is imparted to the rotor assembly. As the rotor assembly rotates, the oscillation mechanism imparts reciprocating movement to the main shaft and the line spool. The reciprocating movement of the line spool ensures that the fishing line is properly wound over the width of the spool. The oscillation mechanism also prevents the main shaft and the line spool from rotating during the winding operation.

U.S. Pat. No. 5,316,239 discloses an oscillation mechanism comprising: a transmission member having a passage extending therethrough for receiving the rearward end of the reel's main shaft; a worm gear extending through the transmission member; an interior shaft keyed through the worm gear; an input gear (i.e., a helical gear) secured on one end of the interior shaft; a pawl held in the transmission member for operably engaging a continuous groove formed around the exterior of the worm gear; a guide rod extending through the transmission member; a cover plate positioned over the outer face of the transmission member for covering the pawl bore; and a bolt threadedly received in the transmission member and through the main shaft. The bolt holds the cover plate on the transmission member and secures the transmission member to the rearward end of the main shaft. The input gear meshes with the reel's pinion gear such that the worm gear is caused to rotate during the winding operation. As the worm gear rotates, the pawl follows the worm groove and thus causes the transmission member to reciprocate linearly along the worm gear. The transmission member, in turn, directly transmits this reciprocating movement to the main shaft and the line spool.

The guide rod employed in the U.S. Pat. No. 5,316,239 mechanism stabilizes the transmission member. As the transmission member reciprocates, the guide rod substantially prevents the transmission member from moving vertically and from moving laterally. Thus, the guide rod prevents excessive play between the worm shaft and the transmission assembly and helps ensure smooth, substantially wobble-free operation of the oscillation mechanism.

Unfortunately, the degree of precision and the amount of labor required for assembling the U.S. Pat. No. 5,316,239 mechanism are undesirably high. To assemble the mechanism, the main shaft and the guide rod must be inserted longitudinally into the reel body and then through enclosed passages formed in the transmission member. Further, the interior shaft of the worm assembly must also be inserted longitudinally into the reel body and then through the worm gear. Assembling the oscillation mechanism is thus time consuming and requires both a relatively high level of manual dexterity and precise alignment of the various components and passages employed in the mechanism.

In addition, to obtain adequate life, the transmission member employed in the U.S. Pat. No. 5,316,239 mechanism must be formed from stainless steel or from some other wear resistant material. As it reciprocates, the transmission member directly contacts and rubs against the guide rod. Thus, unless it is formed from a sufficiently wear resistant material, the transmission member must be frequently replaced. Forming the transmission member from such material can add significantly to the cost of the mechanism.

SUMMARY OF THE INVENTION

The oscillation mechanism provided by the present invention resolves the problems and satisfies the needs identified above. The operational effectiveness of the inventive mechanism is at least equal to that of the mechanism disclosed in U.S. Pat. No. 5,316,239. However, compared to the U.S. Pat. No. 5,316,239 mechanism, the inventive mechanism is much easier to install and requires significantly less precision for assembly and operation. Further, the amount of wear resistant material required for production of the inventive mechanism is at least substantially less than that required for the U.S. Pat. No. 5,316,239 mechanism.

In one aspect, the present invention provides an oscillation assembly for a fishing reel comprising: an elongate member; a transmission body; and reciprocating means for imparting reciprocating movement to the transmission body. The transmission body has a side face and includes a groove formed in the side face for receiving the elongate member.

In another aspect, the present invention provides an oscillation assembly for a fishing reel comprising: an elongate member having a longitudinal axis and a lateral width; a transmission body; and reciprocating means for imparting reciprocating movement to the transmission body. The transmission body has a front face and a side face and includes a slot for receiving the elongate member. The slot extends into the front face and has a side opening provided in the side face. The side opening has a width greater than the lateral width of the elongate member such that the elongate member can be placed in the slot by delivering the elongate member through the side opening.

In yet another aspect, the present invention provides an oscillation assembly for a fishing reel comprising: a worm shaft assembly having an end and including a worm shaft; a gear included in the worm shaft assembly for producing rotation of the worm shaft about the longitudinal axis of the worm shaft; and a retaining means, insertable into the fishing reel adjacent the end of the worm shaft assembly, for contacting by the worm shaft assembly such that the retaining means limits movement of the worm shaft along the longitudinal axis of the shaft.

Further objects, features and advantages of the present invention will be apparent upon examining the accompanying drawings and upon reading the following description of the preferred embodiments.

DESCRIPTION OF THE PREFERRED EMBODIMENTS

Figure 1:
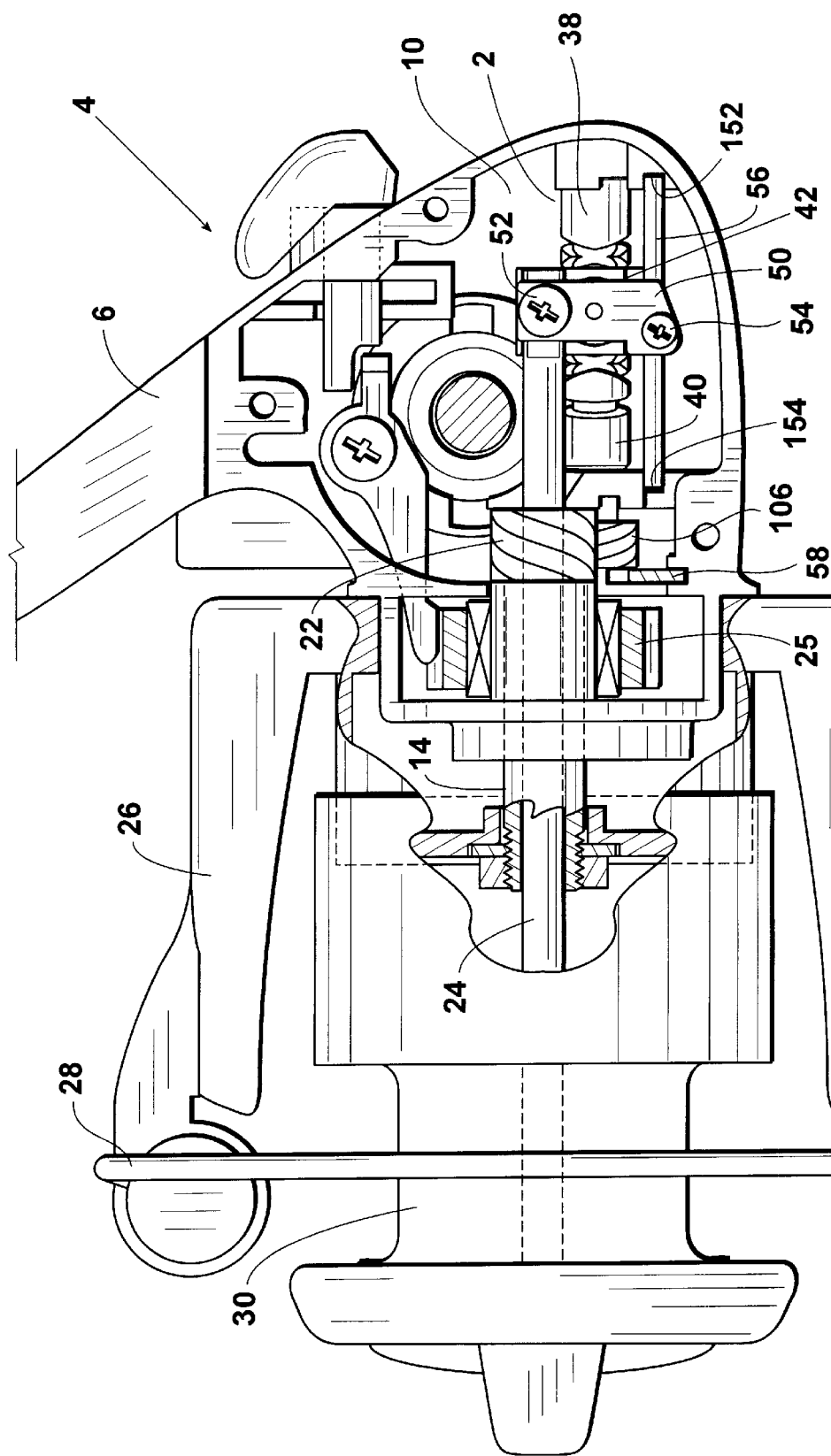
FIG. 1 provides a cutaway, elevational side view of a spinning reel 4 incorporating an embodiment 2 of the inventive oscillation assembly.
Figure 2A:
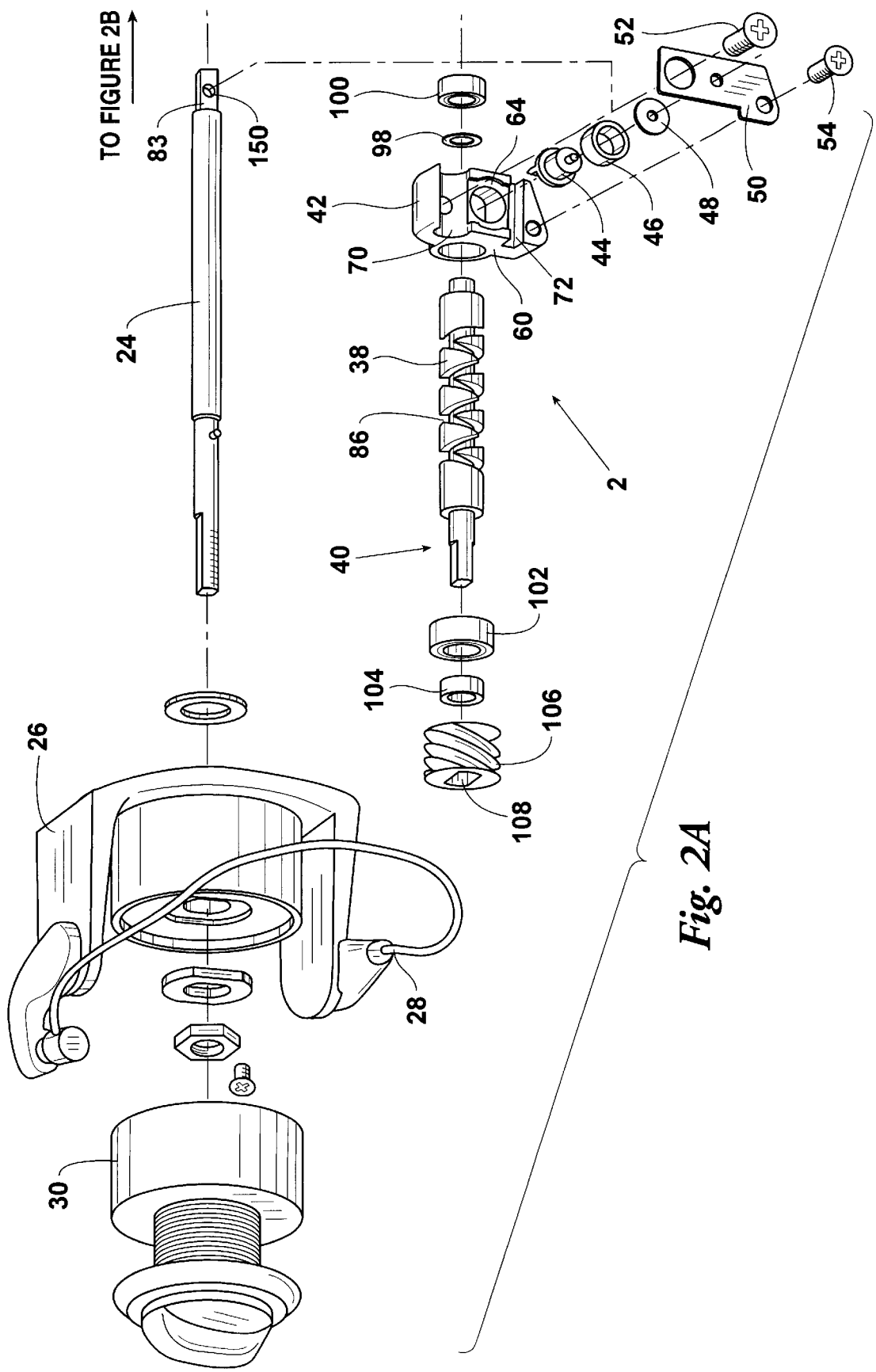
FIGS. 2A, 2B, and 2C provide an exploded, perspective view of reel 4.
Figure 2B:
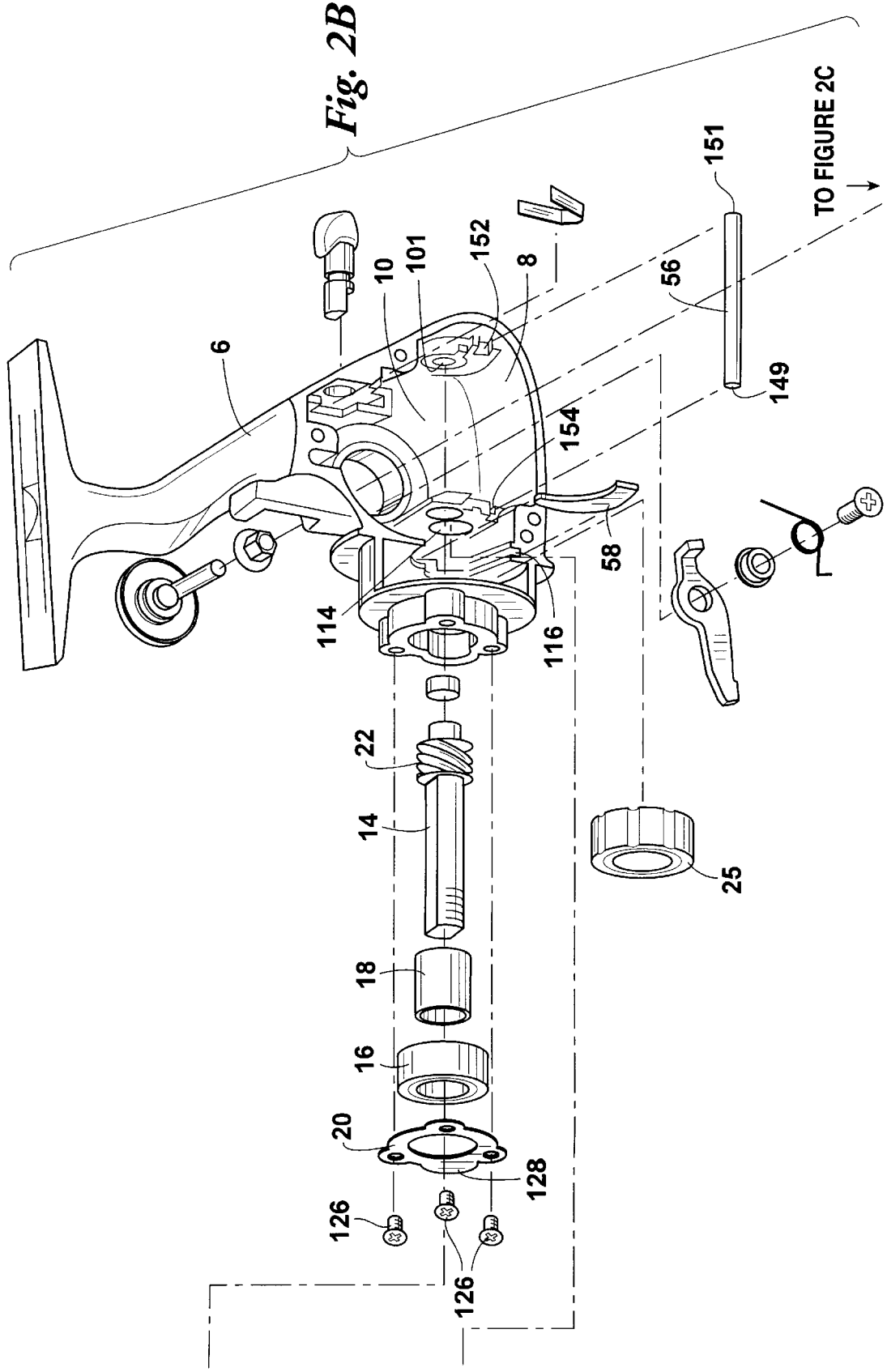
Figure 2C:
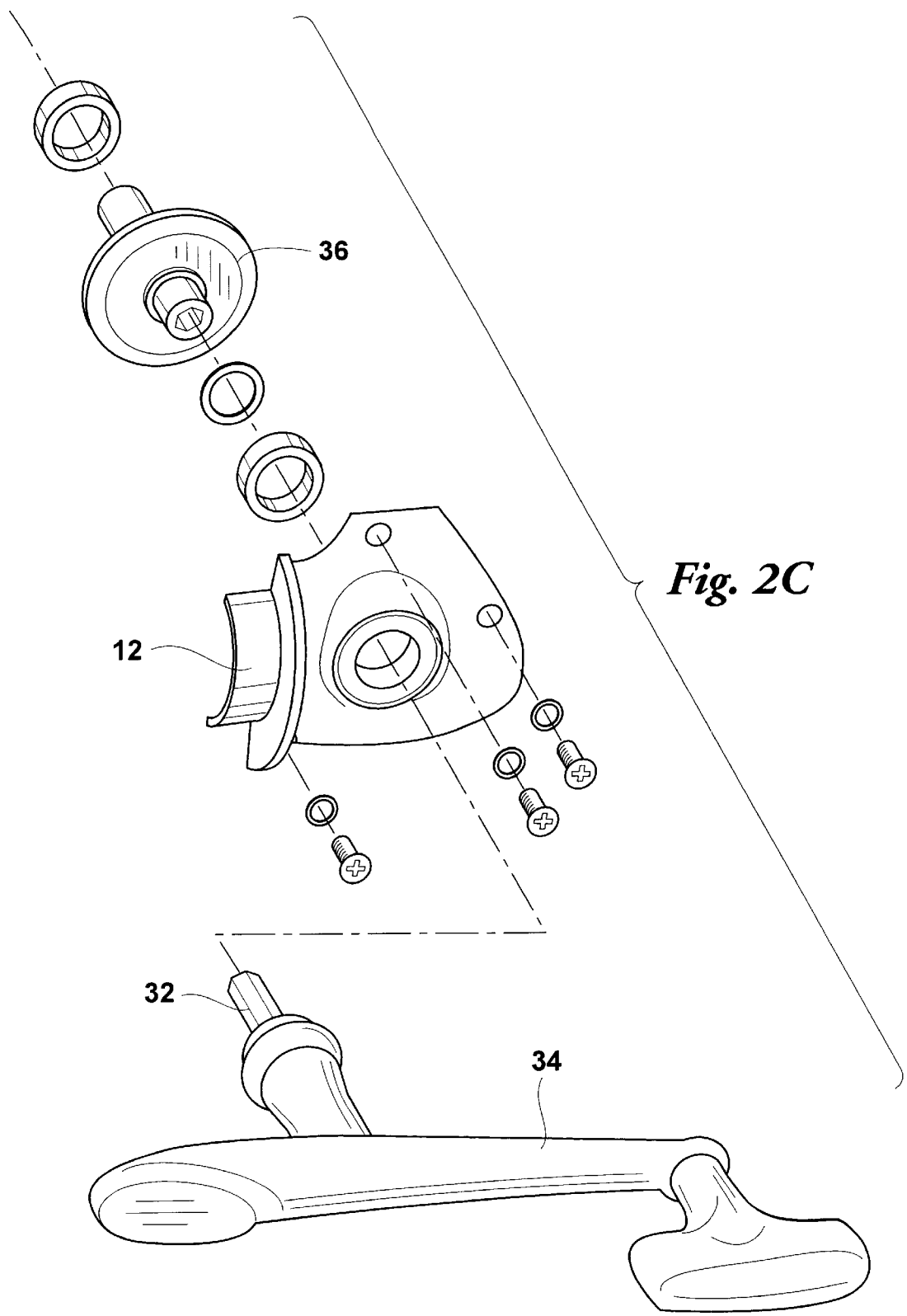
Figure 4:
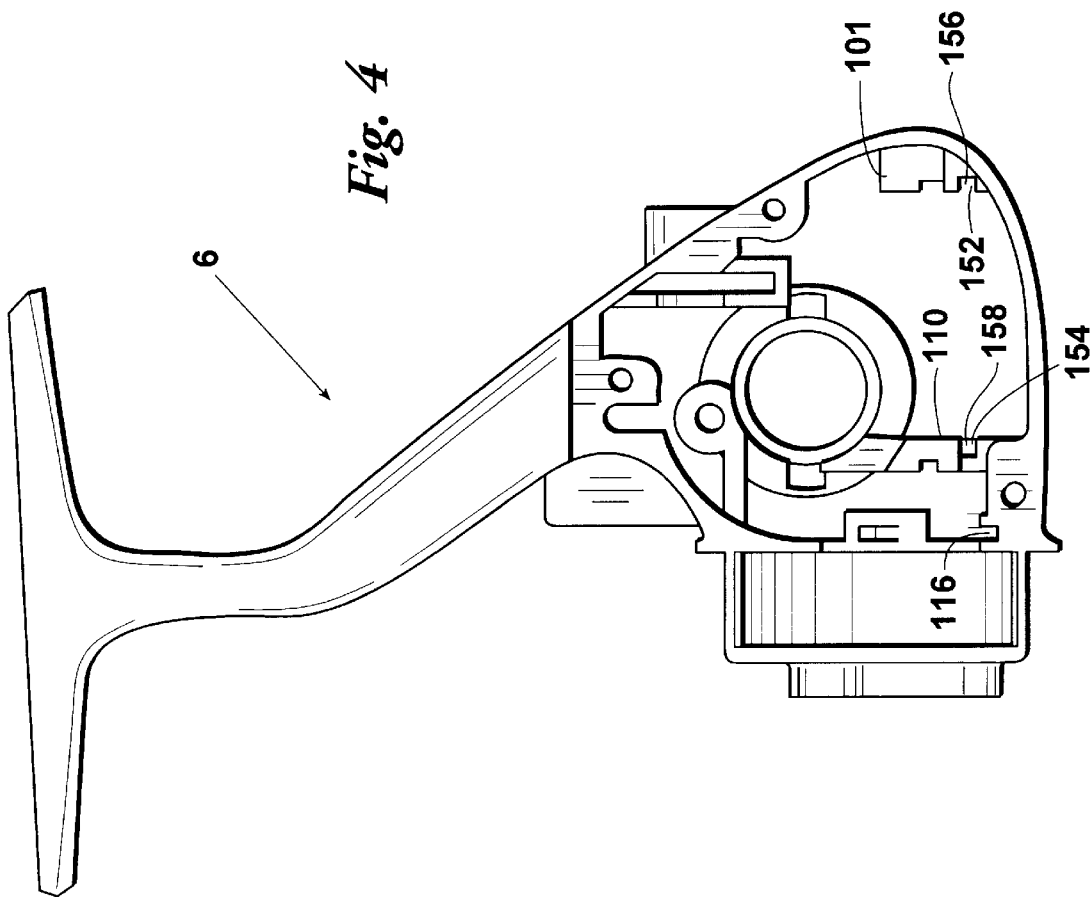
FIG. 4 provides an elevational side view of body structure 6.
Figure 3:
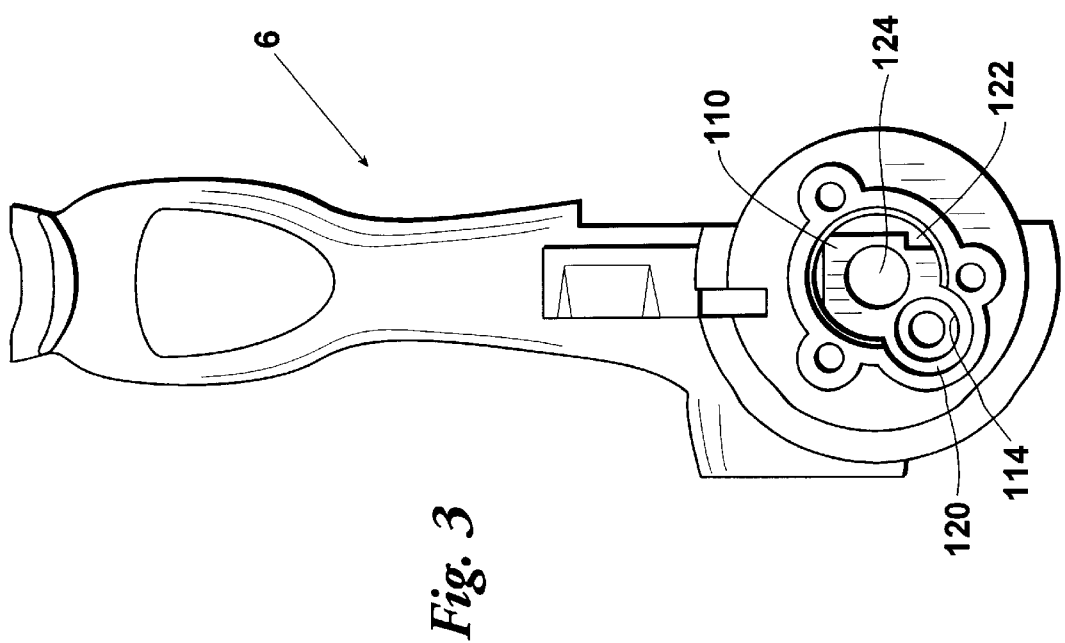
FIG. 3 provides an elevational front view of a body structure 6 employed in reel 4.
Figure 7:
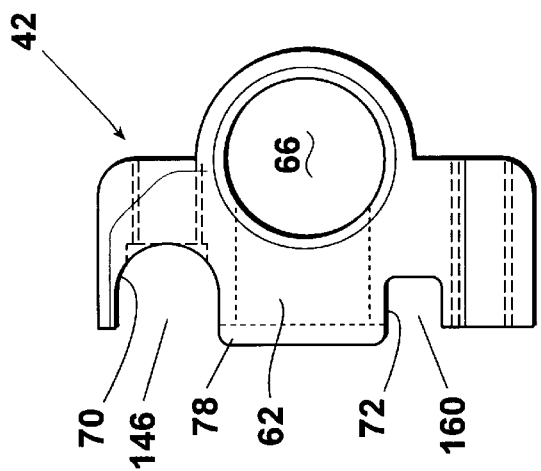
FIG. 7 provides an elevational side view of transmission member 42.
Figure 5:
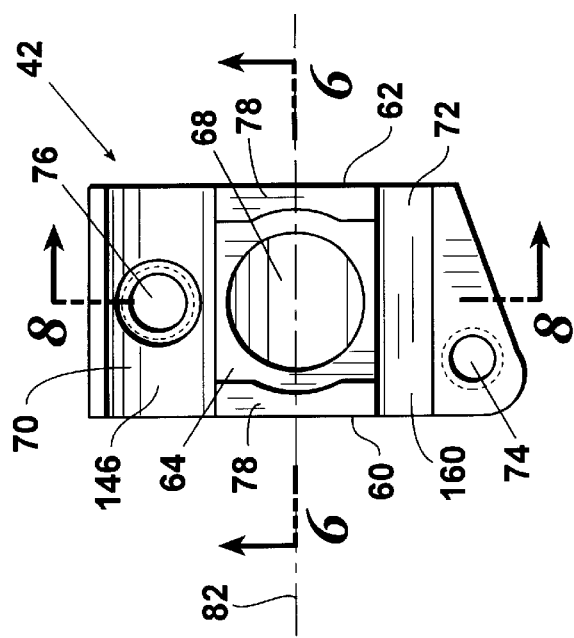
FIG. 5 provides an elevational front view of a transmission member 42 employed in inventive assembly 2.
Figure 6:
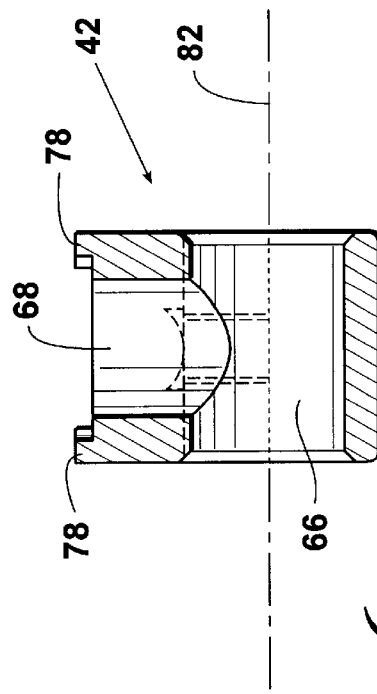
FIG. 6 provides a cutaway, bottom view of transmission member 42 as seen from perspective 6—6 shown in FIG. 5.
Figure 8:
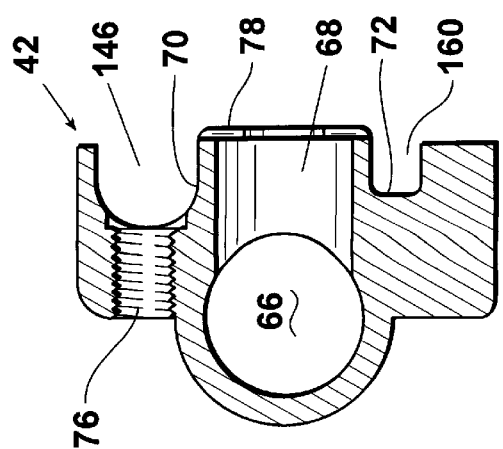
FIG. 8 provides a cutaway, elevational side view of transmission member 42 as seen from perspective 8—8 shown in FIG. 5.
Figure 9:
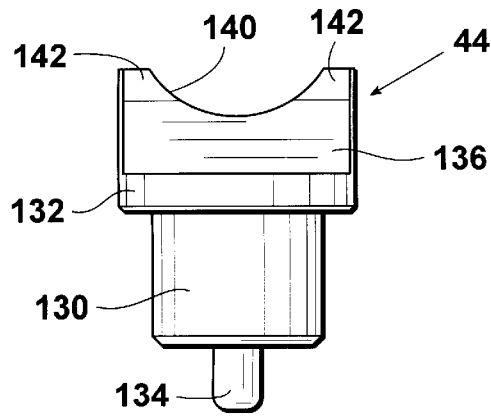
FIG. 9 provides an elevational side view of a pawl 44 employed in inventive assembly 2.
Figure 10:
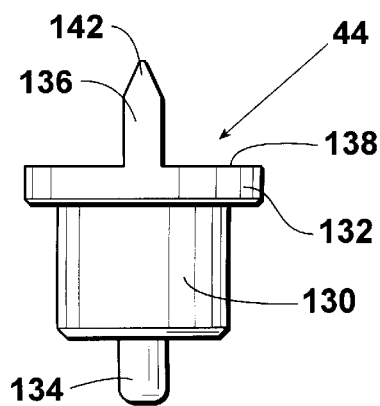
FIG. 10 provides an elevational front view of pawl 44.
Figure 11:
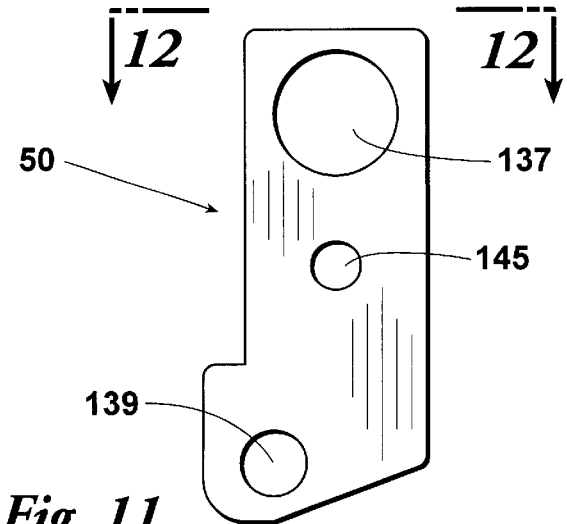
FIG. 11 provides an elevational front view of a retaining cover 50 employed in inventive assembly 2.
Figure 12:
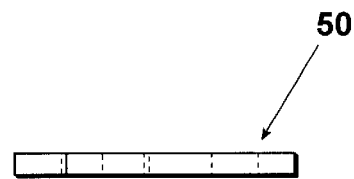
FIG. 12 provides a top view of cover 50 as seen from perspective 12—12 shown in FIG. 11.
Figure 13:
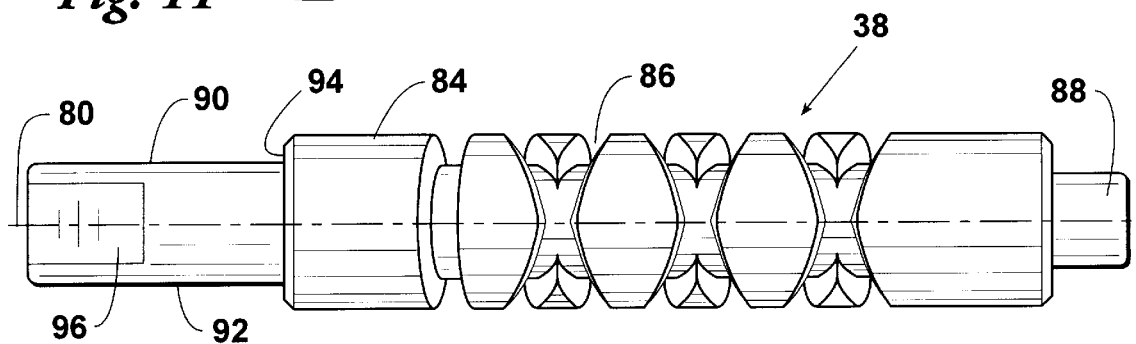
FIG. 13 provides a side view of a worm shaft 38 employed in inventive assembly 2.
Figure 14:
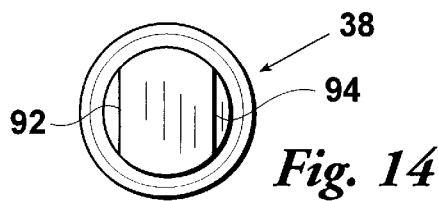
FIG. 14 provides an end view of worm shaft 38.

An embodiment 2 of the inventive oscillation assembly is illustrated in FIGS. 1–15. Inventive assembly 2 is shown as incorporated in a spinning reel 4. Spinning reel 4 further comprises: a reel body 6 having an interior 8 and a side opening 10; a site cover 12 removably attachable over side opening 10; a pinion sleeve 14 rotatably mounted through the forward end of body 6 by means of a bearing 16, a bearing sleeve 18, and a bearing plate 20; a pinion gear (preferably a helical gear) 22 formed around the rearward end portion of pinion sleeve 14; a main shaft 24 slidably extending through pinion sleeve 14; a clutch bearing 25 mounted on pinion sleeve 14 within the forward portion of body 6; a rotor 26 secured on the forward end of pinion sleeve 14; a bail wire assembly 28 operably mounted on rotor 26; a line spool 30 secured to the forward end of main shaft 24; a drive shaft 32 extending laterally into body 6; a handle 34 provided on the exterior end of drive shaft 32; and a drive gear (preferably a face gear) 36 mountable on the interior portion of drive shaft 32.

Drive gear 36 meshes with pinion gear 22 such that, when the user turns handle 34, pinion sleeve 14 and rotor 26 are caused to rotate. As rotor 26 rotates, bail wire assembly 28 grasps the fishing line and wraps the line around line spool 30. At the same time, inventive oscillation assembly 2 imparts a reciprocating motion to main shaft 24 and spool 30 and prevents spool 30 from rotating. Thus, inventive assembly 2 ensures that the line is properly wound and distributed across the entire width of spool 30.

Inventive oscillation assembly 2 comprises: a worm shaft assembly 40; a transmission member 42; a pawl 44; a pawl collar 46; a pawl washer 48; a retaining cover 50; a main shaft screw 52; a cover screw 54; a guide rod 56; and a worm shaft retainer 58.

Transmission member 42 preferably comprises: a forward face 60; a rearward face 62; and a side face 64 extending from forward face 60 to rearward face 62. Transmission member 42 preferably also includes: a cylindrical bore 66, extending through forward face 60 and rearward face 62, for rotatably receiving worm shaft 38; a cylindrical pawl bore 68 (extending laterally from side face 64 into worm shaft bore 66; a main shaft slot 70 formed in side face 64; a guide rod groove 72 formed in side face 64; a first threaded bore 74 located beneath guide rod groove 72 and extending laterally from side face 64 into transmission member 42; a second threaded bore 76 extending laterally from the bottom of shaft slot 70 into transmission member 42; and a pair of shoulders 78 projecting outwardly from side face 64 on opposite sides; of pawl bore 68.

Shaft slot 70 and guide rod groove 72 extend from forward face 60 to rearward face 62 and preferably run parallel to worm shaft bore 66. Slot 70 is preferably positioned above pawl bore 68 and spaced above the longitudinal axis 82 of worm shaft bore 66. Groove 72 is preferably positioned below pawl bore 68 and spaced below the longitudinal axis 82 of worm shaft bore 66.

Worm shaft assembly 40 includes an elongate worm shaft 38 having a longitudinal axis 80. Worm shaft 38 preferably comprises: a cylindrical gear segment 84 having a continuous groove 86 formed around the exterior thereof; a cylindrical rearward end 88 having a diameter smaller than that of gear segment 84; and an extended forward segment 90. Forward segment 90 includes a cylindrical portion 92 positioned adjacent the forward end of gear segment 84. The diameter of cylindrical portion 92 is smaller than that of gear segment 84 such that a radial shoulder 94 is defined at the forward end of gear segment 84. Extended forward segment 90 further includes a beveled end portion 96.

Worm shaft assembly 40 further comprises: a washer 98 positioned around the rearward end 88 of worm shaft 38; a rear bushing 100; a forward bushing 102; a bushing collar 104; and a level wind gear 106. Rear bushing 100 is receivable in a boss 101 provided in the interior 8 of reel body 6 and is sized for rotatably holding the rearward end 88 of worm shaft 38. Bushing collar 104 is positionable within forward bushing 102 and over the cylindrical portion 92 of worm shaft 38. Level wind gear 106 is preferably a helical gear receivable on the beveled forward end portion 96 of worm shaft 38. The passage 108 extending longitudinally through level wind gear 106 has a shape corresponding to that of beveled end 96 such that worm shaft 38 will not rotate independently of level wind gear 106.

When positioned in reel body 6, worm shaft 38 is substantially parallel to main shaft 24 such that level wind gear 106 meshes with pinion gear 22. Worm shaft assembly 40 is rotatably retained in reel body 6 by means of: rearward interior boss 101; an intermediate lateral wall 110 formed in the interior of body 6; and retaining member 58. Lateral wall 110 has a circular aperture 114 provided therethrough for receiving and retaining forward bushing 102.

Retaining member 58 is preferably a flat, plate-like member having a rounded L-shape. A lateral notch 116 is preferably formed in the interior of body 6 for receiving retaining member 58. The rounded, L-like shape of retainer 58 allows retainer 58 to be inserted around pinion sleeve 14 such that retainer 58 does not interfere with the operation of pinion gear 22. When inserted in notch 116, retaining member 58 is loosely positioned between the forward end of worm shaft assembly 40 and clutch bearing 25. Retainer 58 prevents worm shaft assembly 40 from moving a substantial distance forward and thus retains assembly 40 in operating position.

An aperture 120 is provided in the forward end of body 6 for installing worm shaft assembly 40. Worm shaft assembly 40 can be installed in body 6 by the steps of: placing rear bushing 100 in rearward interior boss 101; placing bushing collar 104, forward bushing 102, and level wind gear 106 on the forward end 90 of worm shaft 38; inserting the rearward end of worm shaft 38 through body aperture 120 and through interior wall aperture 114; placing and holding transmission member 42 in body 6; inserting the rearward end of worm shaft 38 through the bore 66 provided in transmission member 42; placing washer 98 around the rearward end 88 of worm shaft 40; and then moving worm shaft 38 fully rearward such that (a) the rearward end 88 of shaft 38 is received in rear bushing 100 and (b) forward bushing 102 is received in wall aperture 114.

A large aperture 122 extending through the forward end of body 6 and an aperture 124 extending through interior wall 110 are provided for installing the main shaft assembly of reel 4. After the main shaft assembly and the worm shaft assembly are installed in body 6, bearing plate 20 is attached over the forward end of body 6 and retaining member 58 is inserted in groove 116. Bearing plate 20 is attached to body 6 by means of bolts 126 and includes a rounded extension 128 which covers aperture 120.

Pawl 44 is a standard worm engaging pawl comprising: a cylindrical body 130; a radially projecting shoulder 132 provided at the forward end of body 130; a small cylindrical hub 134 projecting from the rearward end of body 130; and a blade 136 projecting from the forward face 138 of shoulder 132. Blade 136 is configured for operably engaging worm shaft groove 86. The leading edge of blade 136 comprises a concave, semicircular central portion 140 and a pair of beveled lateral edges 142 provided on opposite sides of concave portion 140. Concave portion 140 is sized and shaped for receiving the interior base of worm shaft groove 86.

The pawl assembly is installed in transmission member 42 by: inserting pawl 44 in pawl bore 68 such that blade 136 is received in worm shaft groove 86; placing pawl collar 46 in bore 68 around the body 130 and against the shoulder 132 of pawl 44; placing washer 48 on the rearward end of pawl 44; and then securing retaining cover 50 over pawl bore 68. Cover 50 has an aperture 145 extending therethrough for receiving cylindrical hub 134. Cover 50 also includes an aperture 137 for receiving main shaft screw 52 and an aperture 139 for receiving cover screw 54.

Cover 50 retains pawl 44 in transmission body 42 such that pawl 44 is allowed to pivot within bore 68. The pivotable freedom of pawl 44 allows blade 136 to track within continuous worm groove 86. Thus, as worm shaft 38 rotates, pawl 44 follows groove 86 such that pawl 44 and transmission member 42 reciprocate longitudinally along worm shaft 38.

Transmission member 42 is secured to the rearward end portion 83 of main shaft 24 such that the reciprocating movement of transmission member 42 is directly transmitted to main shaft 24 and line spool 30. Slot 70 provided in the side face 64 of transmission member 42 has a shape corresponding to that of the rearward end portion 83 of main shaft 24. Further, the outer opening 146 of slot 70 provided in side face 64 has a width greater than that of end portion 83. Thus, unlike the prior art assembly discussed above, main shaft 24 need not be longitudinally inserted into transmission member 42. Rather, end portion 83 can be conveniently placed in slot 70 by simply (a) moving end portion 83 laterally through side opening 146 and/or (b) pivoting end portion into opening 146.

Transmission member 42 is secured on end portion 83 of main shift 24 using main shaft screw 52. Screw 52 extends through cover 50 and through an aperture 150 provided in the end portion 83 of main shaft 24. Screw 52 is threadedly received in transmission member bore 76.

Guide rod 56 guides the reciprocating movement of transmission member 42 to ensure that all of the various elements of inventive oscillation assembly 2 are maintained in proper alignment and orientation. The ends 149 and 151 of guide rod 56 are retained in notches 152 and 154 provided in the interior 8 of body 6. Notch 152 is formed in the rearward portion of body 6 adjacent interior boss 101. Notch 154 is formed in the rearward face of interior wall 110. Notch 152 has an opening 156 which faces laterally outward. In like manner, notch 154 has an opening 158 which faces laterally outward. Openings 156 and 158 are wide enough for receiving the ends 149 and 151 of guide rod 56. When ends 149 and 151 are received in notches 152 and 154, guide rod 56 is substantially parallel to main shaft 24 and to worm shaft 38 and is prevented from moving a significant distance longitudinally. Thus, when reciprocating, transmission member 42 slides longitudinally back and forth along guide rod 56.

The openings 156 and 158 of notches 152 and 154 and the side opening 160 of the guide rod groove 72 provided in side face 54 of transmission member 42 are each wider than guide rod 56. Thus, guide rod 56 need not be inserted longitudinally through transmission member 42. Rather, guide rod 56 can conveniently be delivered laterally through body side opening 10 and into notch openings 156 and 158 and groove opening 160.

Figure 15:
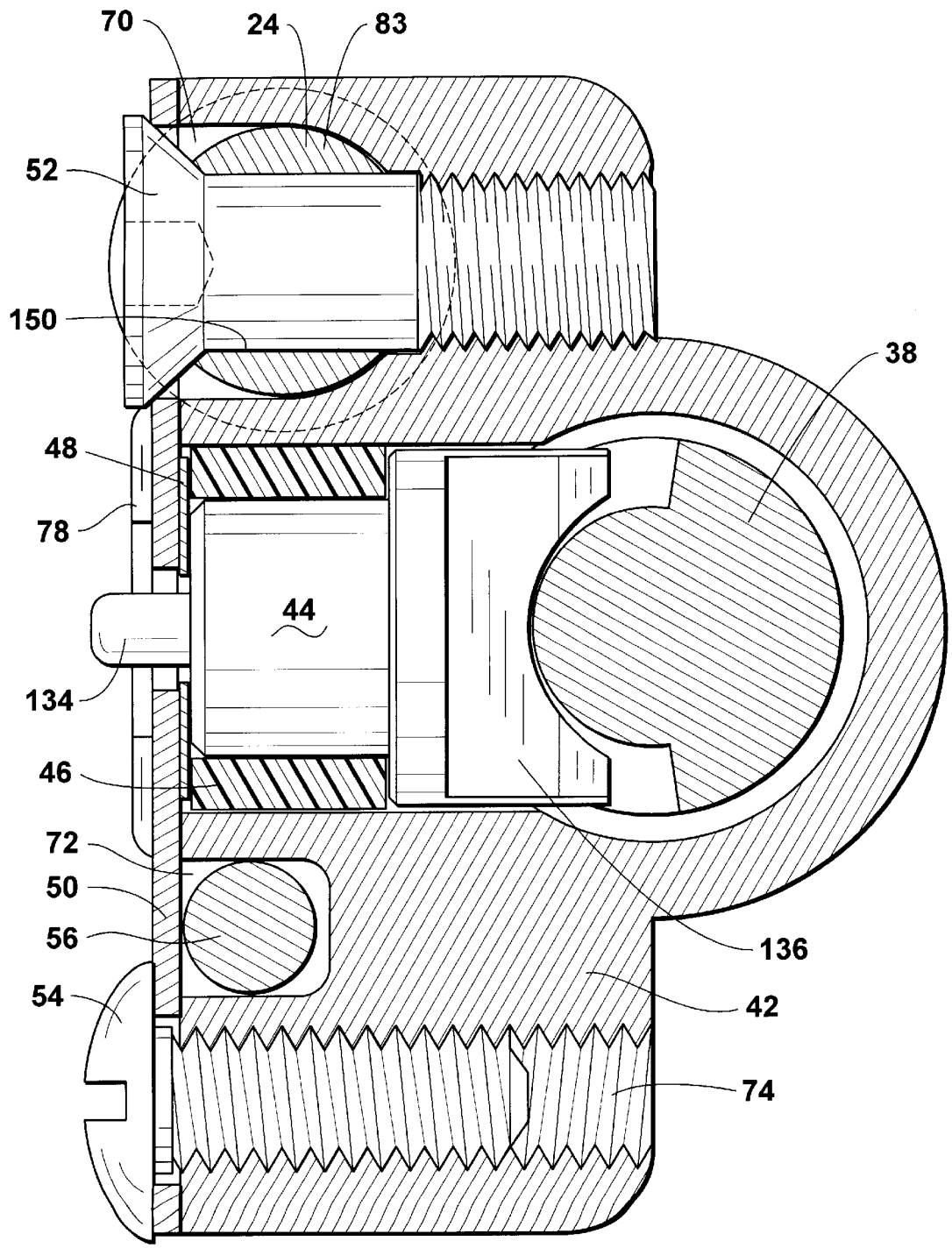
FIG. 15 provides a cutaway side view of an assembly including transmission member 42, pawl 44, worm shaft 38, cover 50, a guide rod 56, and a main shaft 24.

As shown in FIG. 15, the depth of notches 152 and 154 is preferably such that, when transmission member 42 reciprocates, guide rod 56 is primarily contacted by retainer cover 60. Due to the relative positioning of worm shaft 38 and guide rod 56, the torque generated by the rotation of worm shaft 38 also operates to urge cover 60 into contact with guide rod 56. Thus, since guide rod 56 is primarily contacted by cover 60, only cover 60 need be formed from a highly wear resistant material.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An oscillation assembly for a fishing reel comprising:

an elongate guide rod;

a transmission body;

a side cover; and reciprocating means for imparting reciprocating movement to said transmission body, said transmission body including a bottom and a side face extending upwardly from said bottom, said transmission body further including a groove formed in, and extending across said side face, said guide rod having a longitudinal axis and said guide rod being receivable in said groove such that, during said reciprocating movement, said transmission body will reciprocate on said guide rod along said longitudinal axis, said guide rod having a width and said groove having a width greater than said width of said guide rod such that said guide rod can be delivered laterally into said groove, and said cover being attachable on said side face for covering said groove with said guide rod received therein.

2. The oscillation assembly of claim 1 further comprising positioning means for positioning said guide rod and said transmission body such that, during said reciprocating movement, said cover is maintained in sliding contact with said guide rod.

3. The oscillation assembly of claim 1 wherein said reciprocating means comprises:

a worm shaft assembly including a worm shaft rotatably receivable through said transmission body, said worm shaft assembly having a forward end;

a gear included in said worm shaft assembly for producing rotation of said worm shaft; and a retaining member, loosely positionable in said fishing reel forwardly of said forward end of said worm shaft assembly, for contacting by said forward end of said worm shaft assembly such that said retaining member limits a longitudinal movement of said worm shaft assembly and thereby retains said worm shaft assembly in an operating position.

4. The oscillation assembly of claim 3 wherein said retaining member is a substantially flat, plate-like article.

5. The oscillation assembly of claim 4 wherein said retaining member has a rounded L-like shape.

6. The oscillation assembly of claim 1 wherein said groove is a first groove, and said oscillation assembly further comprises:

a second groove formed in said side face;

a main shaft of said fishing reel, said main shaft having an end portion receivable in said second groove; and securing means for securing said end portion in said second groove whereby said transmission body will impart said reciprocating movement to said main shaft.

7. The oscillation assembly of claim 6 wherein said securing means comprises a threaded member receivable through said cover and in said end portion of said main shaft.

8. The oscillation assembly of claim 1 wherein:

said side face has a first end and a second end and said groove extends across said side face from said first end to said second end.

9. An oscillation assembly for a fishing reel comprising:

a worm shaft assembly having a forward end and including a worm shaft having a longitudinal axis;

a gear included in said worm shaft assembly for producing rotation of said worm shaft about said longitudinal axis; and a retaining member, loosely positionable in said fishing reel forwardly of said forward end of said worm shaft assembly, for contacting said forward end of said worm shaft assembly such that said retaining member limits movement of said worm shaft along said longitudinal axis.

10. The oscillation assembly of claim 9 wherein said retaining member is a substantially flat, plate-like article.

11. The oscillation assembly of claim 10 wherein said retaining member has a rounded L-like shape.

12. An oscillation assembly for a fishing reel comprising:

a guide rod having a longitudinal axis;

a transmission body having a side face and a groove formed in said side face;

reciprocating means for imparting reciprocating movement to said transmission body;

a fishing reel body having a side opening and an interior; and a pair of opposing notches formed in said interior, said guide rod being receivable in said groove such that, during said reciprocating movement, said transmission body will reciprocate on said guide rod along said longitudinal axis, and said guide rod having a first end and a second end and each of said notches having an opening which faces laterally outward such that, by delivering said guide rod laterally into said side opening of said fishing reel, said guide rod can be placed in said groove and said first and second ends of said guide rod can be placed in said notches.

* * * * *

UNITED STATES PATENT AND TRADEMARK OFFICE
CERTIFICATE OF CORRECTION

PATENT NO : 5,934,586
DATED : August 10, 1999
INVENTOR(S) : Kang, et al.

It is certified that error appears in the above-identified patent and that said Letters Patent is hereby corrected as shown below:

On title page, item 73 ASSIGNEE replace "ZEBCO CORPORATION, TULSA, OKLA."

with --ZEBCO DIV. OF BRUNSWICK CORPORATION, TULSA, OKLA.--

Signed and Sealed this

Twenty-ninth Day of February, 2000

*Attest:*

Q. TODD DICKINSON

*Attesting Officer*  *Commissioner of Patents and Trademarks*